INVENTORS
CHARLES STERN
ROBERT GALLAY
ATTORNEYS

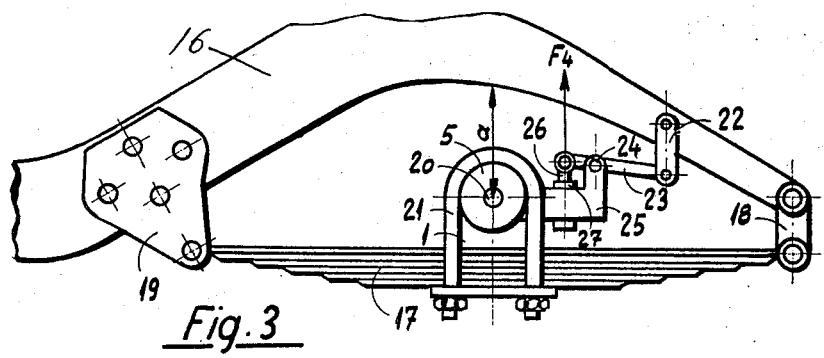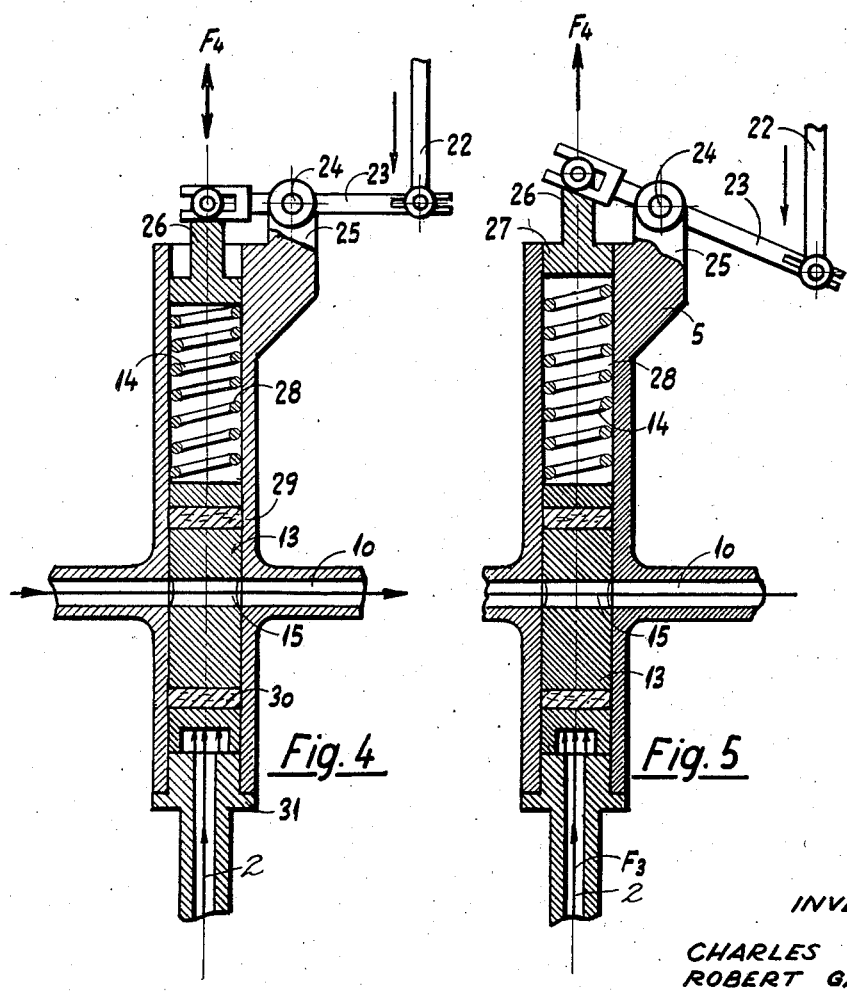

United States Patent Office 2,845,149
Patented July 29, 1958

2,845,149

LOAD RESPONSIVE FLUID BRAKE

Charles Stern and Robert Gallay, Geneva, Switzerland

Application May 24, 1954, Serial No. 431,946

8 Claims. (Cl. 188—195)

This invention relates to fluid-pressure braking devices and more particularly to hydraulic braking devices for motor vehicles and the like.

It is an object of the invention to provide a fluid-pressure braking device for motor vehicles in which at least one of the wheels of the vehicle is solidly connected with the driving pinion of a gearwheel-pump mounted in a fluid-pressure circuit while the housing of said pump is fastened to a solid part of the vehicle frame, a valve controlled by a brake-lever being inserted in the pressure pipe of the said pump in such a way as to cause, by means of a decrease of the output of the pump, a braking action upon the wheel connected solidly to the driving pinion of the pump.

Another object of the invention is the provision of a fluid-pressure braking system whereby a differential braking action can be applied to each wheel of the vehicle proportionally to the instantaneous load carried by each wheel.

Other objects and advantages of this invention will be more apparent from the following detailed description of one approved form of device constructed and operating according to the principles of this invention.

The accompanying drawings show diagrammatically by way of example this form of construction applied to a motor vehicle.

Fig. 3 is a side view of the mounting device of a braking pump and its pre-selection control mechanism.

Fig. 4 represents, on an enlarged scale, a cross section through a preselection device, shown in the position of the vehicle having its load equally distributed on its four wheels.

Fig. 5 represents a similar cross section as shown in Fig. 4 with the vehicle having an increased load on the wheel equipped with the pump shown.

Figure 1:
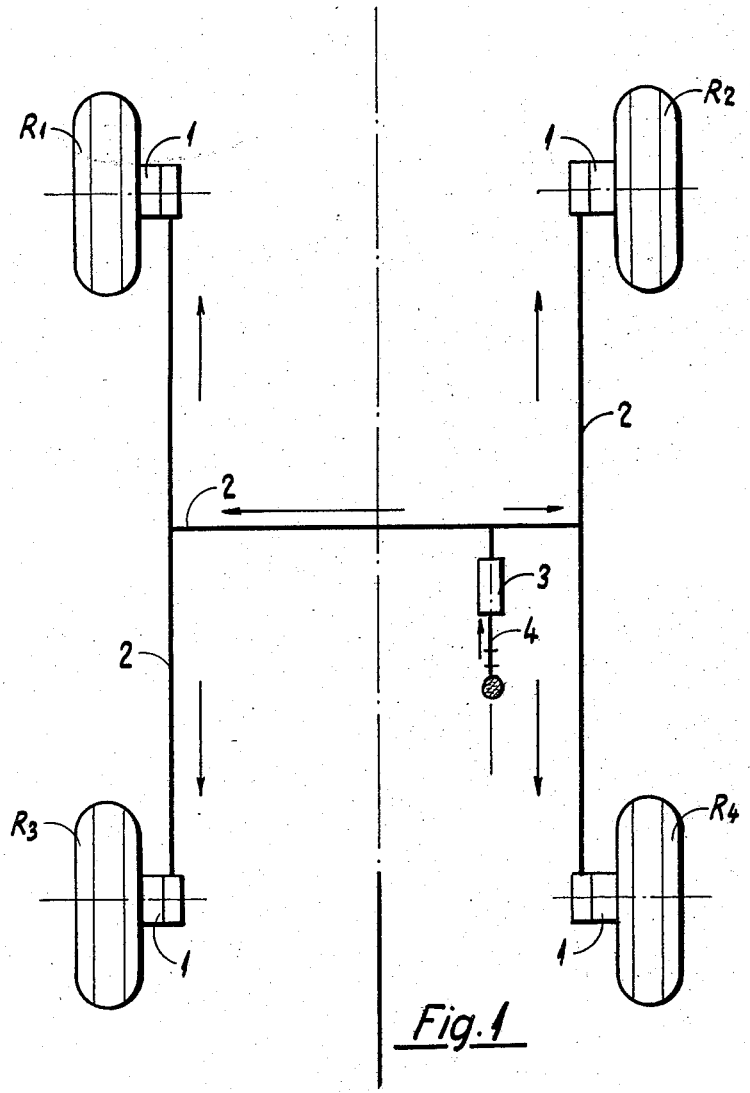
Fig. 1 is a diagrammatical general view of the device.
Figure 2:
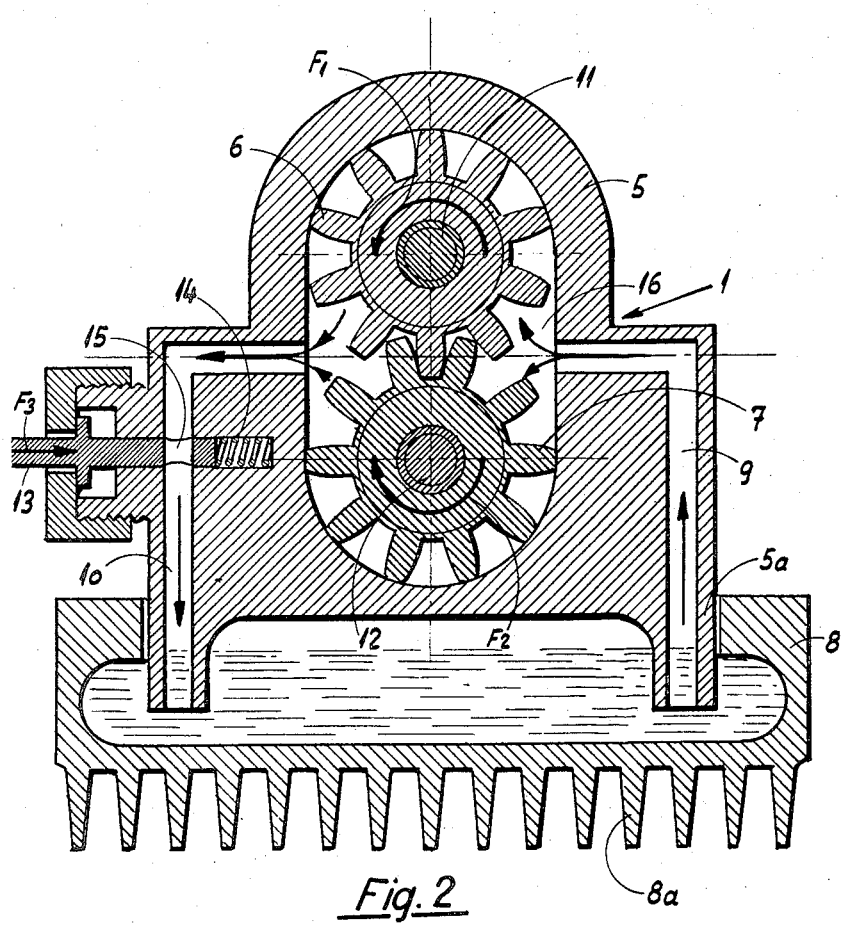
Fig. 2 is an enlarged radial cross section of a braking pump.

The hydraulic braking device as shown is applied to the four wheels $R^1$, $R^2$, $R^3$, $R^4$ of a motor vehicle (Fig. 1) and comprises four gearwheel-pumps 1, each of which is coupled to the hub of one of the wheels R. Each of the four pumps is inserted in an individual oil-filled circuit and their pressure-valves are governed by means of an oil-pressure circuit 2 common to all pumps, and controlled from a master-cylinder 3, the piston of which is actuated by a brake-lever 4 which may be connected either to a brake-pedal or to a brake-lever located underneath the steering wheel. Each wheel of the vehicle is therefore provided with its own braking device, which will be now described separately referring to the Figures 2 to 5 of the drawing.

The pump 1 comprises on the one hand a pump housing 5 in the inside of which rotate two pinions 6 and 7 meeting with each other and, on the other hand, another housing part 8, screwed in a tight manner on the lower tubular portion 5a of the pump housing 5. This housing part 8 is provided with cooling ribs 8a and serves as an oil-tank. The oil circulates in a closed circuit in the housing 5, to which it is fed by the suction pipe 9 and from where it leaves through the pressure pipe 10 to return into the housing part 8. The pinion 6 associated with the shaft 11 drives the pinion 7 on the shaft 12 and is coupled to the wheel R which it is desired to submit to the braking action, whereas the housing 5 is solidly connected and fastened to a frame part or, for instance the buffer spring 17 bearing the said wheel of the vehicle. There is inserted in the pressure pipe 10 of the housing 5 a valve 13, the plunger of which is under the influence of a spring 14 intended to maintain the aperture 15 of the said plunger constantly in exact alignment with the bore of the pressure pipe 10.

Each wheel R of the vehicle is provided with an identical braking device. If the vehicle runs freely, with no braking power applied, the hub of the wheel causes the driving pinion 6 to rotate in the direction of the arrow $F^1$. Pinion 6 in turn drives pinion 7 in the direction of the arrow $F^2$. The underpressure or suction produced in the zone 16 of the housing 5 causes the oil contained in the oil-tank 8 to be aspired through the suction pipe 9 and to be pressed back into the same oil-tank 8 in a closed circuit through the pressure pipe 10. In this circuit, the oil has to flow through the aperture 15 of the valve 13. If the driver applies the brake, he will, by means of the braking lever 4 (Fig. 1), actuate the master-cylinder 3, which in turn will exert a hydraulic pressure upon the valve 13 by means of the conduit-tube 2. The valve 13 will move in the direction of the arrow $F^3$ and will therefore compress the spring 14. The aperture 15 will then cease to be in exact alignment with the bore of the pressure pipe 10 and the latter will therefore be partially or fully closed. The oil being able to circulate only in a limited manner in the closed circuit because of the partially obstructed aperture 15, it will oppose a certain resistance against the rotation of the intermeshing pinions 6, 7 and in turn will result in a more or less pronounced braking action exerted upon the wheel, the hub of which is coupled to the pinion 6. To release this braking action, it will suffice to bring back the valve to its original position in which the aperture 15 fully registers with the bore of the pressure pipe 10.

The Figures 3, 4 and 5 represent a device permitting of a differential braking action on the four wheels $R^1$, $R^2$, $R^3$, $R^4$ of the motor vehicle shown diagrammatically in Fig. 1. It is well known that when a motor vehicle takes a turn, the centrifugal force causes the load on the outer side of the said vehicle to be increased by a certain amount, whereas the loading of the inner side will decrease by a like amount. It is also known, that under the action of inertia forces the front axle will be overloaded by a certain amount, whereas the loading of the rear axle will be decreased by a like amount. The loads carried by each of the four wheels will therefore differ from each other. If it becomes necessary to brake in a turn of the road and if no risk of slipping is to be incurred, it becomes absolutely necessary that the braking power applied to each wheel be proportional to the load supported by each wheel. The device shown in the Figures 3, 4 and 5 permits of varying the tension of the spring 14, opposed to the closing of the valve 13, as a function of the load supported by the wheel which is equipped with the braking pump.

The curved part of the chassis-beam of the vehicle is connected to the buffer-spring 17 by means of tie-clips 18 and 19. The axle 20 carrying the wheel to which is coupled the pinion 6 of the brake-pump is supported by the buffer-spring 17 by means of ties 21. To these latter is fastened the pump housing 5. One end of a vertically extending link 22 is articulated to the chassis-beam 16, whereas its other end is hinged to the arm of a horizontally extending lever 23. This lever 23 is hinged to a support 25 by means of the shaft 24, the support 25 forming a part of the pump housing 5. The other arm of the lever 23 is hinged to a vertical rod 26 forming part of a piston 27, which latter may be moved in an up- or downward direction within the cylindrical bore 28 of the pump housing 5, and against which bears the spring 14. This spring tends to keep the plunger 13 with its aperture 15 in the open and normal position, viz. in the position in which the aperture 15 is aligned exactly with the bore of the pressure pipe 10 of the pump. The oil tightness of the plunger 13 in the bore 28 is assured by packing rings 29 and 30. The oil of the circuit 2 acts upon the plunger 13 through a tube joint 31.

The link and lever system 22, 23 causes the spring 14 to become more or less compressed. If the vehicle rolls on a straight trajectory, the loads are uniformly distributed on all four wheels. If the distance "a" between the highest point of the beam 16 and the axle 20 does not vary from one wheel to another, the link and lever system 22, 23 will not change its position and the tension of the spring 14 will be the same for all of the four wheels. If the vehicle starts into a turn, the centrifugal force overloads the exterior side of the chassis and as a consequence thereof, the buffer-springs 17 of the outside wheels will become more strongly compressed than those of the inside wheels. Since the distance "a" will decrease proportionally with the load supported by each wheel, the vertical link 22 will cause the lever 23 to turn around shaft 24 in a clockwise direction, thus moving the rod 26 in the direction of the arrow $F^4$. The decompression of the spring 14 under the action of the rod 26 will take place as shown in Fig. 5. It is quite evident that the amount of decompression will be proportional to the centrifugal force, viz. the square of the vehicle speed and inversely proportional to the radius of the turn of the trajectory.

It is therefore equally evident, that if the driver brakes on a straight trajectory, the tension of the four springs 14 with which the valves of the four pumps are equipped being equal, the four plungers 13 will be actuated simultaneously by the pressure oil fed by the master-cylinder 3 over the conduit system 2. These plungers will therefore move in the direction of the arrow $F^3$ by an equal distance. The braking effect will therefore be distributed uniformly on the four wheels. On the other hand, if the driver brakes in a turn, the tension of the springs 14 will not be equal for all four pumps; this tension will be weaker for the springs of the pumps connected with the wheels carrying the heaviest load, due to the combined influence of the centrifugal and inertia forces. The oil pressure in the circuit 2 governing the plungers 13 being always the same for all plungers, the plunger 13 associated with the least tensioned spring 14 will be moved over a longer distance than the others and will therefore throttle more effectively the output of its pump. As a result thereof, the wheel with the heaviest loading will be subjected to a stronger braking action.

Fig. 5 shows the effect caused by a curved trajectory upon the spring 14, which tends to keep the plunger 13 in the open position. This effect of automatic pre-selection permits of realizing a differential braking, wherein the braking effort is for each wheel a function of the instantaneous load carried by each wheel.

It is quite evident, that the control of the valves of the brake pumps could be realized by means of a device comprising a pressure circuit filled with any fluid whatever, such as for instance compressed air, or by means of a mechanical or electrical device.

It is to be understood, that the assembly of the brake pumps and of the control device for the valves may vary according to the design and construction of the vehicle on which they are to be installed.

Means of cooling the internal and closed oil circuit of the pumps, other than the ribs 8a, may also be provided.

What we claim is:

1. In a motor vehicle, the combination with at least one of the vehicle wheels, of a fluid-pressure braking device comprising a fluid-pressure circuit, a gearwheel pump inserted in said circuit and dividing the same into a suction part and a pressure part, the driving pinion of said pump being solidly connected with said wheel and the housing of said pump being fastened to a non-rotating part of the vehicle, a valve inserted in the pressure part of said circuit, spring means for holding said valve in open position, means operable by the driver of the vehicle for actuating said valve against the action of said spring means, so as to throttle the output of said pump and thereby brake said wheel; means pivotally carried by the vehicle frame for automatically varying the tension of the valve spring means in function of the instantaneous load supported by said wheel, so as to automatically modify the force opposing the throttling of the pump output in function of said instantaneous load.

2. In a motor vehicle, the combination with the vehicle wheels of a fluid-pressure braking device, comprising for each vehicle wheel a closed fluid-pressure circuit, a gearwheel pump inserted in each of said circuits and dividing the same into a suction part and a pressure part, the driving pinion of each pump being solidly connected with the associated vehicle wheel and the housing of each pump being fastened to a non-rotating part of the vehicle, a valve inserted in the pressure part of each of said circuits, spring means for holding said valves in open position, means operable by the driver of the vehicle for simultaneously actuating all said valves against the action of said spring means, so as to throttle the output of all said pumps and thereby braking their associated wheels, and means pivotally carried by the vehicle frame for automatically and individually varying the tension of the valve returning spring means as a function of the instantaneous load individually supported by each wheel, so as to automatically modify the force opposed to the throttling of the output of each pump exerted by said spring means as a function of said instantaneous load.

3. In a motor vehicle, the combination with the vehicle wheels of a fluid-pressure braking device as claimed in claim 2, wherein the means operable by the driver of the vehicle for simultaneously actuating the valves inserted in the pressure parts of the circuits consist of a hydraulic circuit governed by a master-cylinder controlled by a brake lever.

4. In a motor vehicle comprising a plurality of wheels supported by buffer-springs hingedly connected with the vehicle frame, the combination with the vehicle wheels of a fluid-pressure braking device comprising for each wheel a closed fluid-pressure circuit, a gearwheel pump inserted in each of said circuits and dividing the latter into suction parts and pressure parts, the driving pinion of each pump being drivingly connected with the associated wheel and the housing of each pump being fastened to a buffer-spring of the vehicle frame, a valve inserted in the pressure part of each of said circuits, spring means in each of said valves for normally holding the same in open position, a general hydraulic circuit operatively connected with each of said valves, a master-cylinder for distributing oil in said general hydraulic circuit, a brake lever operable by the driver of the vehicle for controlling said master-cylinder and thereby simultaneously actuating all said valves against the action of their spring means, so as to throttle the output of all said pumps and simultaneously brake all the wheels, link and lever means pivotally connected at their one end to the vehicle frame and fulcrumed on said valve, said link and lever means being hingedly connected at their other end to said spring means for automatically and individually varying the tension of the valve spring means in function of the bending of the buffer-spring supporting the wheel under the action of the instantaneous load supported by said buffer-spring, thereby automatically modifying the force opposed to the throttling of the output of each pump as exerted by said spring means as a function of said instantaneous load.

5. In a motor vehicle, the combination with at least one of the vehicle wheels of a fluid pressure braking device comprising a fluid pressure circuit, a gearwheel pump inserted in said circuit, the driving pinion of said pump being drivingly connected with said wheel and the housing of said pump being fastened to a non-rotary member of the vehicle frame, a valve inserted in said circuit on the pressure side of said pump, spring means for normally holding said valve in open position, means operable by the driver of the vehicle for actuating said valve against the action of said spring means to throttle the output of said pump and thereby brake said wheel, and means carried by the vehicle frame for continuously varying the tension of said valve-returning spring means as a function of the instantaneous load supported by said wheel, whereby at any moment the force opposing the throttling of the pump output is a function of said instantaneous load.

6. In a motor vehicle, the combination with the vehicle wheels of a fluid pressure braking device comprising for each vehicle wheel a closed fluid pressure circuit, a gearwheel pump inserted in each of said circuits, the driving pinion of each pump being drivingly connected with the associated vehicle wheel and the housing of each pump being fastened to a non-rotary member of the vehicle frame, a valve inserted in the circuit on the pressure side of each of said pumps, spring means for normally holding said valves in open position, means operable by the driver of the vehicle for simultaneously actuating all said valves against the action of said spring means to throttle the output of all said pumps and thereby brake their associated wheels, and means carried by the vehicle frame for automatically and individually varying the tension of the valve returning spring means in function of the instantaneous load individually supported by each wheel, so as to automatically modify the force opposing the throttling of the output of each single pump as a function of said instantaneous load.

7. In a motor vehicle, the combination with the vehicle wheels of a fluid pressure braking device as claimed in claim 6, wherein the means operable by the driver of the vehicle for simultaneously actuating the valves inserted in the circuits on the pressure side of the individual pumps consist of a hydraulic circuit governed by a master-cylinder controlled by a brake lever.

8. In a motor vehicle comprising a plurality of wheels supported by buffer-springs hingedly connected with the vehicle frame, the combination with the vehicle wheels of a fluid pressure braking device comprising for each wheel a closed fluid pressure circuit, a gearwheel pump inserted in each of said circuits, the driving pinion of each pump being drivingly connected with the associated vehicle wheel and the housing of each pump being fastened to a buffer-spring of the vehicle frame, a valve inserted in the circuit on the pressure side of each of said pumps, spring means for normally holding said valves in open position, a general hydraulic circuit operatively connected with each of said valves, a master cylinder for distributing oil in said general hydraulic circuit, a brake lever operable by the driver of the vehicle for controlling said master-cylinder and thereby simultaneously actuating all said valves against the action of their returning spring means so as to throttle the output of all said pumps and simultaneously brake all the wheels, link and lever means pivotally connected at their one end to the vehicle frame and hingedly connected at their other end to a piston adapted to bear against the valve returning spring means of each single pump for automatically and individually varying the tension thereof in function of the bending of the buffer-springs supporting the associated wheel under the action of the instantaneous load supported by said buffer-springs, so as to automatically modify the force opposing the throttling of the output of each pump as a function of said instantaneous load.

References Cited in the file of this patent

UNITED STATES PATENTS

| | | |
|---|---|---|
| 1,584,223 | Horspool et al. | May 11, 1926 |
| 1,694,951 | Reynolds | Dec. 11, 1928 |
| 1,926,296 | Merchie | Sept. 12, 1933 |
| 2,035,387 | Heritier | Mar. 24, 1936 |
| 2,413,162 | Ackerman | Dec. 24, 1946 |
| 2,573,831 | Burckhalter | Nov. 6, 1951 |
| 2,574,426 | Trevaskis | Nov. 6, 1951 |